United States Patent [19]

Taniguchi et al.

[11] 4,389,109
[45] Jun. 21, 1983

[54] CAMERA WITH A VOICE COMMAND RESPONSIVE SYSTEM

[75] Inventors: Nobuyuki Taniguchi, Sakai; Masaaki Nakai, Nara; Tokuji Ishida, Daito; Isamu Uchida, Kawachinagano, all of Japan

[73] Assignee: Minolta Camera Co., Ltd., Osaka, Japan

[21] Appl. No.: 220,777

[22] Filed: Dec. 29, 1980

[30] Foreign Application Priority Data

Dec. 31, 1979 [JP] Japan .................................. 54-171491

[51] Int. Cl.³ ...................... G03B 17/18; G03B 17/40; G10L 1/00
[52] U.S. Cl. .................................... 354/60 L; 354/128; 354/138; 354/217; 354/289; 367/198; 179/1 SD; 179/1 SM; 179/1 VC
[58] Field of Search .................... 354/230, 60 R, 60 E, 354/60 L, 289, 217, 218, 238, 266–268, 131, 75, 76, 127, 128; 179/1 SB, 1 SD, 1 SM, 1 VC, 1 SP; 340/148; 364/525, 709, 710; 367/198

[56] References Cited

U.S. PATENT DOCUMENTS

| 4,003,063 | 1/1977 | Takahashi et al. ........... 354/60 R X |
| 4,021,828 | 5/1977 | Iura et al. .............................. 354/217 |
| 4,087,630 | 5/1978 | Browning et al. ................. 179/1 SD |
| 4,192,590 | 3/1980 | Kitaura .......................... 354/60 L X |
| 4,209,244 | 6/1980 | Sahara et al. .................... 354/238 X |
| 4,219,260 | 8/1980 | Date et al. ........................... 354/238 |
| 4,221,927 | 9/1980 | Dankman et al. .............. 367/198 X |
| 4,222,644 | 9/1980 | Tano et al. ....................... 354/60 L |
| 4,270,852 | 6/1981 | Suzuki et al. ..................... 354/60 E |

FOREIGN PATENT DOCUMENTS 54-107343 8/1979 Japan .
54-109838 8/1979 Japan .
1433770 4/1976 United Kingdom ............. 179/1 SB

OTHER PUBLICATIONS

"Prospectives in Voice Response from Computers", by William D. Chapman.
R. L. A. Trost, "Film Slave", Nov. 1976, Elektor, vol. 2, No. 11, pp. 1135–1137.

Primary Examiner—William B. Perkey
Attorney, Agent, or Firm—Jackson, Jones & Price

[57] ABSTRACT

A camera with a voice command system includes a switch which selectively brings the voice command system to one of learning and working modes. During the learning mode, various command voices spoken into a microphone and each registered in the camera at a designated section. During the working mode, a spoken command voice is compared with each one of the registered command voices and recognized by the one that correlates mostly for generating a control signal relying on the identified section.

50 Claims, 7 Drawing Figures

CAMERA WITH A VOICE COMMAND RESPONSIVE SYSTEM

BACKGROUND OF THE INVENTION

The present invention relates to a camera provided with a voice responsive system.

Usually, a camera is operated manually by a user in such a way that he or she sets the camera in a desired mode and releases the shutter by operating a shutter button. Furthermore, the user has to take the camera in his hand to check various settings of the camera, such as shutter speed, F-stop number or used frame number. Although in the case where the self-timer is operated and the camera releases the shutter by itself without the help of the user, still must be previously set and initiated by the user.

Therefore, in the case where the user's hands or eyes are busy with other tasks, it is almost impossible for him to operate a camera. However, there are cases in which the user requires to take a photograph when his hands and eyes are occupied with other tasks. For example, the user may require to take a photograph when he is standing on an unstable footing.

SUMMARY OF THE INVENTION

Accordingly, it is an object of the present invention to provide a camera which is provided with a voice command responsive system.

It is also an object of the present invention to provide a camera of the above described type which can respond to the user's utterance in a dialog manner.

It is another object of the present invention to provide a camera which can be operated without a user's finger touching the camera.

It is still another object of the present invention to provide a camera which responds to user's voice commands and makes audible indications with a camera initiated voice.

To accomplish these and other objects, a camera with a voice command responsive system according to the present invention comprises a switching means for selectively bringing the system to one of a learning mode and a working mode, a voice coding means for coding a voice signal to a recognizable pattern signal and for producing a voice feature signal, and a register means having a plurality of sections each adapted for registering one voice feature signal during the learning mode. A designator means, which is operable only during the learning mode, is provided for designating one of the plurality of sections of the register means for presenting a voice feature signal to the designated section. A discriminator means, which is operable only during the working mode, is provided for discriminating or identifying one of the plurality of sections carrying the voice feature signal which correlates mostly with a voice feature signal newly obtained in accordance with a user's command voice and for generating a control signal relying on the identified section. The camera with a voice command responsive system further comrpises a control means for controlling the camera in response to the control signal.

BRIEF DESCRIPTION OF THE DRAWINGS

These and other objects and features of the present invention will become apparent from the following description taken in conjunction with a preferred embodiment thereof with reference to the accompanying drawings, in which:

FIGS. 3a and 3b taken together as in FIG. 3 show a flow chart showing the operation carried out by the circuit of FIG. 2;

DETAILED DESCRIPTION OF PREFERRED EMBODIMENT

Figure 1:
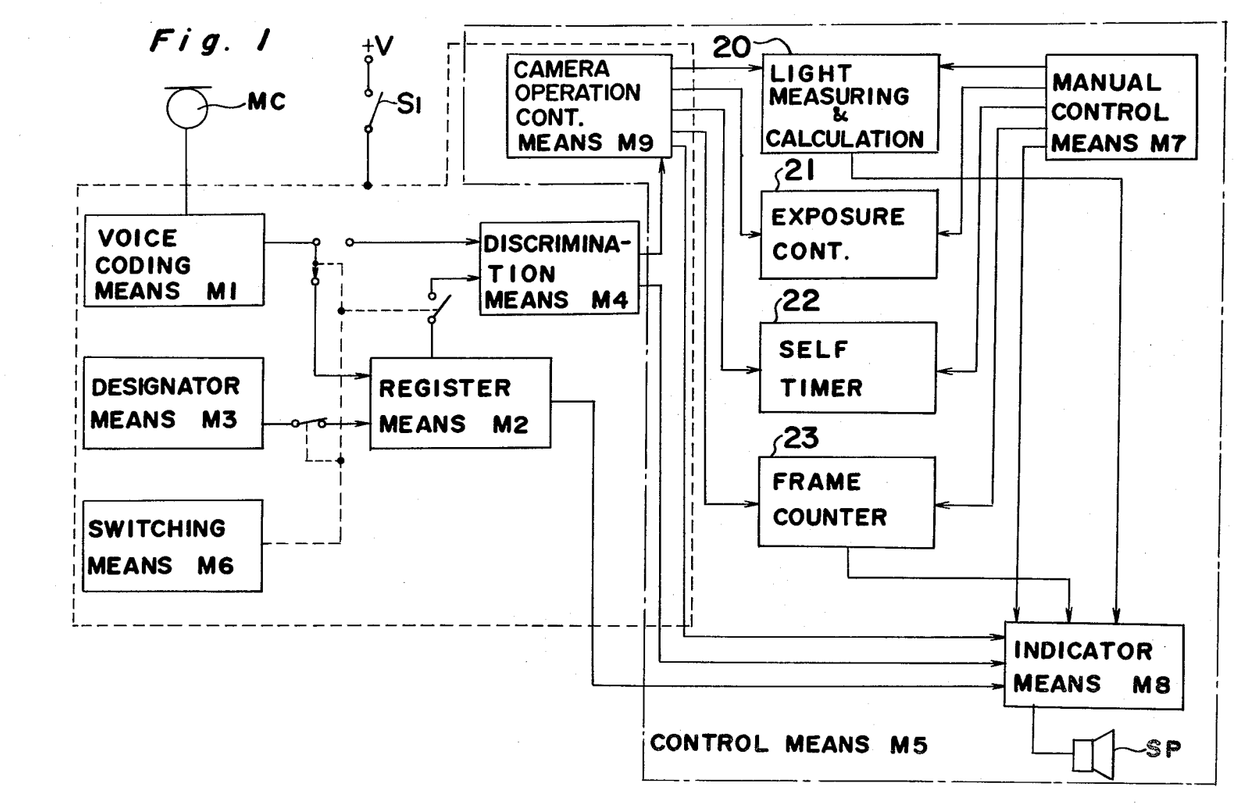
FIG. 1 is a block diagram of a camera with a voice command responsive system according to an embodiment of the present invention.

Referring to FIG. 1, a camera provided with a voice command system according to an embodiment of the present invention comprises a voice coding means M1 coupled with a microphone MC for coding the spoken voice signal to a recognizable pattern signal through the step of a feature extraction of the spoken voice received by the microphone MC and for producing a voice feature signal, a register means M2 having a plurality of sections, each section being capable of storing a voice feature signal, a designator means M3 for designating a section in the register means M2 to which the voice feature signal is stored, a discrimination means M4 for discriminating which one of the sections in the register means M2 is stored with the voice feature signal that is identical with the voice feature signal received from the voice coding means M1 and for generating a control signal relying on the section discriminated in the register means M2, a control means M5 connected to the discrimination means M4 for controlling the operation of a camera in accordance with the control signal from the discrimination means M4, and a switching means M6 for selectively changing the connection among the means M1 to M4 between a learning mode and a working mode.

When the system is set to the learning mode, the voice coding means M1 and the designator means M3, are connected to the register means M2, and the register means M2 is disconnected from the discrimination means M4, as shown in FIG. 1, for storing various voice feature signals from the voice coding means M1 in different sections in the register means M2 relying on the designation by the designator means M3.

When the system is switched to the working mode, the voice coding means M1 and the register means M2 are connected to the discrimination means M4, and the designator means M3 is disconnected from the register means M2 for allowing the discrimination means M4 to discriminate a section in the register means M2 storing the voice feature signal which is identical with that received from the voice coding means M1 receiving a command voice signal from the microphone, and for furnishing a control signal to the control means M5.

The control means M5 includes a camera operation control means M9 which is connected a light measuring and calculation circuit 20, exposure control circuit 21, self timer circuit 22 and frame counter 23. The light measuring and calculation circuit 20 and the frame counter 23 are connected to a visual and audio indicator means M8 which is coupled with a speaker SP. The indicator means M8 is also connected with the register means M2, discrimination means M4 and camera operation control means M9. The register means M2 produces a signal indicative of completion of registration of voice feature signal and applies it to the indicator means M8 for indicating the completion. The discrimination means M4 produces, when the voice feature signal obtained in accordance with a user's command voice correlates with none of the registered voice feature signals, a no-registration signal which is applied to the indicator means M8 for indicating the failure of a matching operation. The calculation circuits 20 and 23 produce data which are to be indicated through indicator means M8, and control means M9 and M7 produce control signals to the indicator means M8. The control means M5 further includes a manual control means M7 which is connected to the circuits 20, 21, 22 and 23 and to the indicator means M8. The detail of the control means M5 will be described later in connection with FIG. 4. S1 is a switch for applying power to the circuit enclosed by a dotted line, and is preferably turned off when it is not desired to control the camera through command voices.

Figure 2:
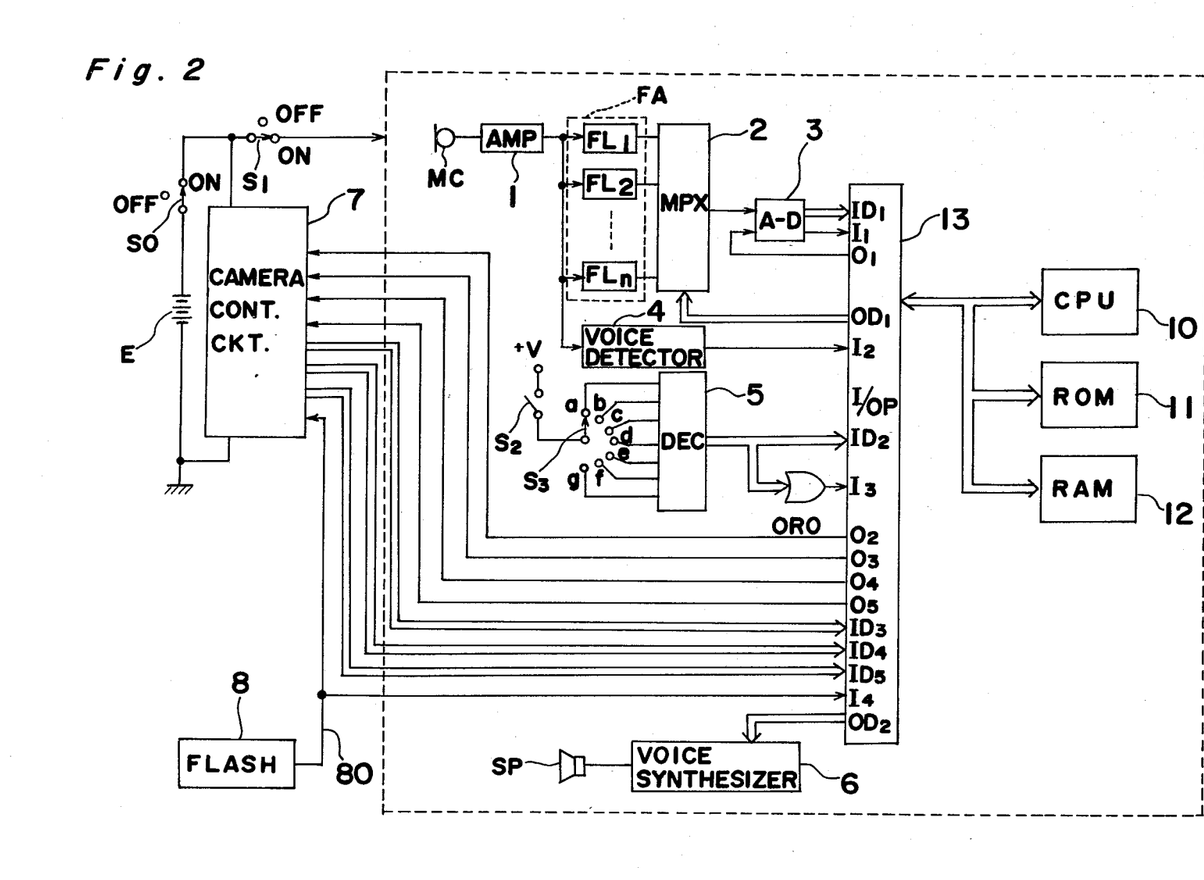
FIG. 2 is a further detailed block diagram of the camera provided with a voice command system of FIG. 1, particularly showing the detail of a voice processing section.

Referring to FIG. 2, the voice coding means M1 of FIG. 1 includes a buffer amplifier 1 connected to the microphone MC serving as a pre-amplifier for amplifying a voice signal obtained from the microphone, a frequency analyzer FA constituted of a plurality of band-pass filters FL1, FL2, . . . , FLn (n being an integer), a multiplexer 2, and an analog-to-digital converter 3. The voice coding means M1 further includes a voice detector 4 connected to the amplifier 1 for producing a start signal when the signal from the amplifier 1 exceeds a predetermined level, and a microcomputer which comprises an input-and-output port 13, central processing unit (CPU) 10, read only memory (ROM) 11 and random access memory (RAM) 12.

When the microphone MC receives an utterance or a command voice, it generates a voice signal which is applied through the buffer amplifier 1 to the voice detector 4 and also to the frequency analyzer FA. In the frequency analyzer FA, the voice is sampled at various frequency bands at the same time. For this purpose, each one of the filters FL1 to FLn is responsive to one particular band of n bands so as to cover from 100 Hz to 5 KHz with the filters altogether. The frequency analyzed signals, namely spectra signals, are applied to the multiplexer 2 which, upon receipt of a timing signal from output terminal OD1 of the input-and-output port 13, sequentially transmits the samples of spectra signals one after another to the analog-to-digital converter 3 for the conversion of spectra signals from analog to digital form. The converted spectra signals are then applied to the microcomputer through input terminal ID1 of the input-and-output port 13 (I/O port). A similar operation is repeatedly carried out for a number of times with an interval of 10 ms during one utterance. For reducing the length of data, i.e., spectra signals in each 10 ms. the spectrum signal as obtained from each band-pass filter is represented by a ratio of spectrum signal obtained from each band-pass filter to average spectrum signal of all the spectra signals from the filters FL1 to FLn. Such an operation is generally referred to as compression. Then, in the microcomputer, the data for one utterance is normalized in time domain to extract a feature of the utterance. Therefore, the utterance is coded by a predetermined length of a binary code signal. For a generator understanding of the voice coding by the feature extraction, reference may be made to a magazine "Electronics" published by McGraw-Hill, issued on May 10, 1971, from pages 84 to 89. The embodiment being explained herein may utilize the voice coding system shown in the magazine. The A-D conversion in the analog-to-digital converter 3 is carried out in response to a signal obtained from an output O1 and the completion of the conversion is informed by a signal applied from the analog-to-digital converter 3 to an input I1.

The designator means M3 includes two manually operable switch arrangements S2 and S3, of which the switch S2 is provided for controlling the electric power supply to the switch S3 and the switch S3 is provided for selectively directing the power to one of a plurality of e.g. seven, terminals a, b, c, d, e, f and g of a decoder 5. The decoder 5, upon receipt of a signal from the selected one of the terminals a to g, produces a 3-bit signal which differs depending on the selected terminal. For example, when the terminal a is supplied with power, the decoder 5 produces a 3-bit signal of (001), and when the terminal b is supplied with power, the decoder 5 produces a 3-bit signal of (010), and so on as shown in Table 1. The 3-bit signal from the decoder 5 is applied to an input ID2 of the input-and-output port 13 for designating one of various storing sections or areas, in the RAM 12. The storing sections are previously assigned to different camera operations as listed in Table 1. The signal from the decoder 5 is also applied through an OR gate OR0 to an input I3 of the port 13 for informing the computer of the learning mode.

TABLE 1

| Terminal | 3 bit Signal | Camera Operations | Spoken Command (Example) |
|---|---|---|---|
| a | 001 | Supply power to light measuring and calculation circuit and to indicator | Power |
| b | 010 | Start exposure control | Start |
| c | 011 | Start self-timer photographing | Self |
| d | 100 | Vocal announcement of F-stop No. | F-stop |
| e | 101 | Vocal announcement of shutter speed | Speed |
| f | 110 | Vocal announcement of charged condition of flash light | Flash |
| g | 111 | Vocal announcement of frame number | Frame |

When the user speaks his desired command word, such as "power", as given in the right hand column of the Table 1, into the microphone MC with the switch S2 being on and switch S3 being connected to terminal a, the spoken word "power" is registered in the RAM 12 in linked relation with the camera operation of "supply power to light measuring and calculation circuit and to indicator". In a similar manner, the user may register his desired command word to each one of the predetermined sections in RAM12 respectively assigned to the camera operations, as shown in the right hand column of the Table 1 as an example.

It is to be noted that the camera operations listed in Table 1 from top to bottom rows are referred to as camera operations, a, b, c, d, e, f and g, respectively, and the corresponding spoken commands are referred to as spoken commands a, b, c, d, e, f and g, respectively.

It is also to be noted that the sections in the RAM 12 which are assigned to camera operations a, b, c, d, e, f and g, respectively, are referred to as sections a, b, c, d, e, f and g, respectively. Since the spoken commands a to g are registered in the RAM 12 in linked relation with the desired camera operations, they are understood to be registered, respectively, in the sections a to g, respectively.

Still referring to FIG. 2, the control means M5 of FIG. 1 corresponds to an audio-indicator constituted of a voice synthesizer 6 coupled with a speaker SP and connected to a terminal OD2 of the input-and-output port 13 for producing synthesized voices that relate to the camera operations d, e, f and g. The control means M5 further includes a camera control circuit 7 which operates the camera upon receipt of signals from output terminals O2, O3, O4 and O5 of the input-and-output port 13 and provides data, such as, exposure time, F-stop number and used frame number to input terminals ID3, ID4 and ID5 of the port 13. Also included in the control means M5 is a flash light device 8 which produces a high level signal along a lead line 80 when a main capacitor provided in the flash light device is charged to or beyond a predetermined voltage level. The lead line 80 is connected to input I4 of the input-and-output port 13 and also to the camera control circuit 7.

It is to be noted here that the voice coding means M1, register means M2, discrimination means M4 and camera operation control means M9 are understood to be incorporated in the microcomputer.

E designates a source of electric power which is connected with a main switch S0 and a switch S1. When the main switch S0 and the switch S1 are on, the power source E provides electric power to all the elements of FIG. 2 other than the flash light device 8, for actuating the voice command responsive system and the camera control circuit 7. When the switch S1 is turned off and the main switch S0 is turned on, the power source E provides power only to the camera control circuit 7 for actuating only the camera control circuit 7, which will then be operated manually. Therefore, when it is not necessary to carry out camera control through voice or to register command voice, the switch S1 should be turned off.

Figure 5:
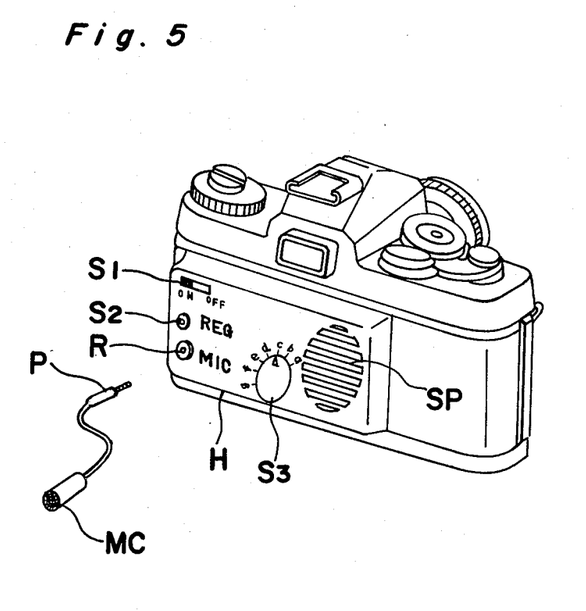
FIG. 5 is a perspective view of a camera provided with a voice command system according to the present invention.

FIG. 5 shows one arrangement of the voice control system mounted on a back of a camera body. All the circuits of FIG. 2 other than the flash light device 8 are installed in a compartment H formed in a back lid of the camera. R is a socket which receives a plug P of the microphone MC, SP is the speaker that announces information with synthesized voice, S1 is the switch that turns on and off the voice command system, S2 is the switch that changes the system between the learning mode and working mode, and S3 is the switch that designates a section to which the command voice should be registered.

Table 2 shows the list of signals and data of signals which are supplied to and produced from the terminals of the output-and-input port 13.

TABLE 2

| Terminal | Data |
|---|---|
| ID1 | Frequency analyzed signal presented in digital form |
| I1 | Signal indicative of completion of analog to digital conversion |
| O1 | Start signal for starting analog to digital conversion |

TABLE 2-continued

| Terminal | Data |
|---|---|
| OD1 | Data for selecting one of the outputs from the filters FL1 to FLn which is to be applied to the analog-to-digital converter 3 |
| I2 | Signal for starting the coding of spoken voice |
| ID2 | Data designating the sections in RAM 12 |
| I3 | Signal indicating the learning mode |
| O2 | Signal for starting power supply to light measuring and calculation circuit and to indicator |
| O3 | Signal for starting automatic exposure photographing |
| O4 | Signal for starting self-timer photographing |
| O5 | Signal for reading out the used frame number |
| ID3 | Data of set or anticipated aperture value |
| ID4 | Data of set or anticipated shutter speed value |
| ID5 | Data of used frame number |
| I4 | Signal indicative of completion of charge in the main capacitor of the flash light device |
| OD2 | Data for synthesized voice |

Figures 3, 3A:
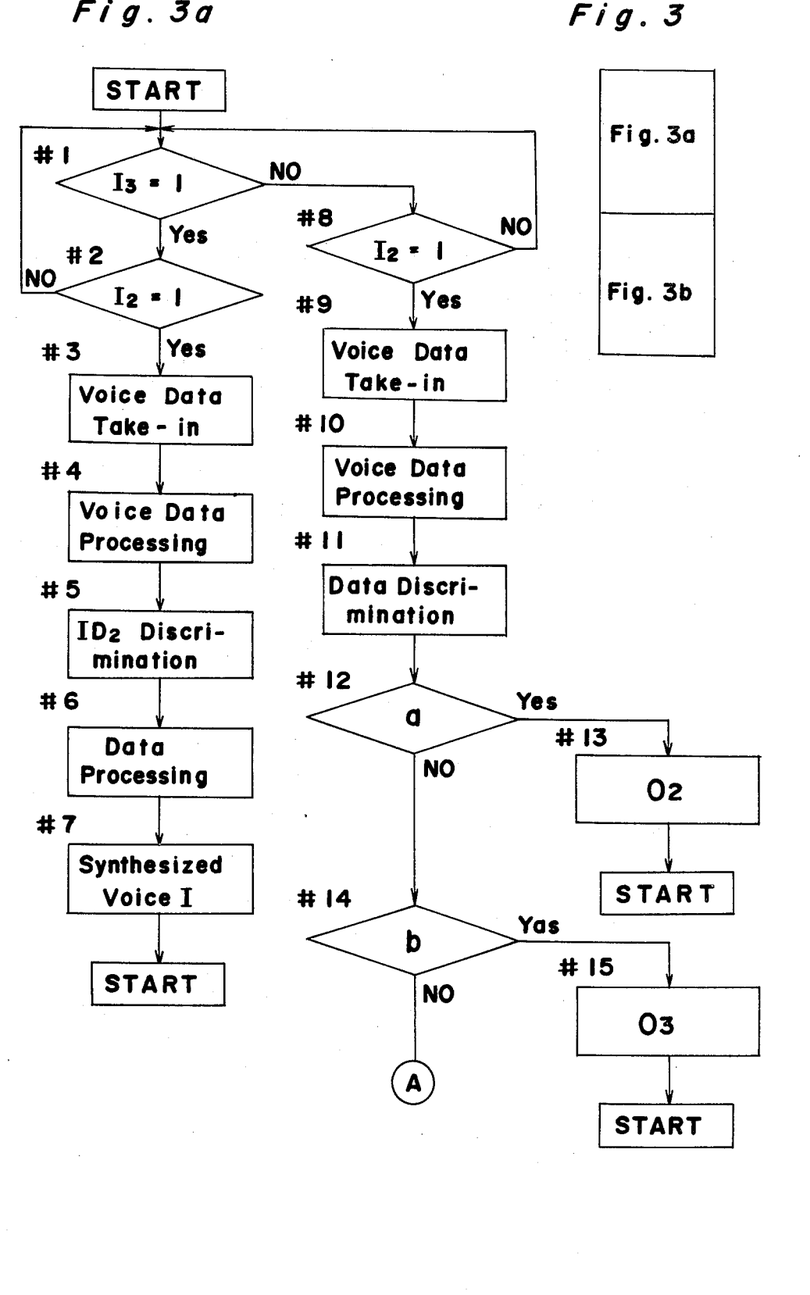
Figure 3B:
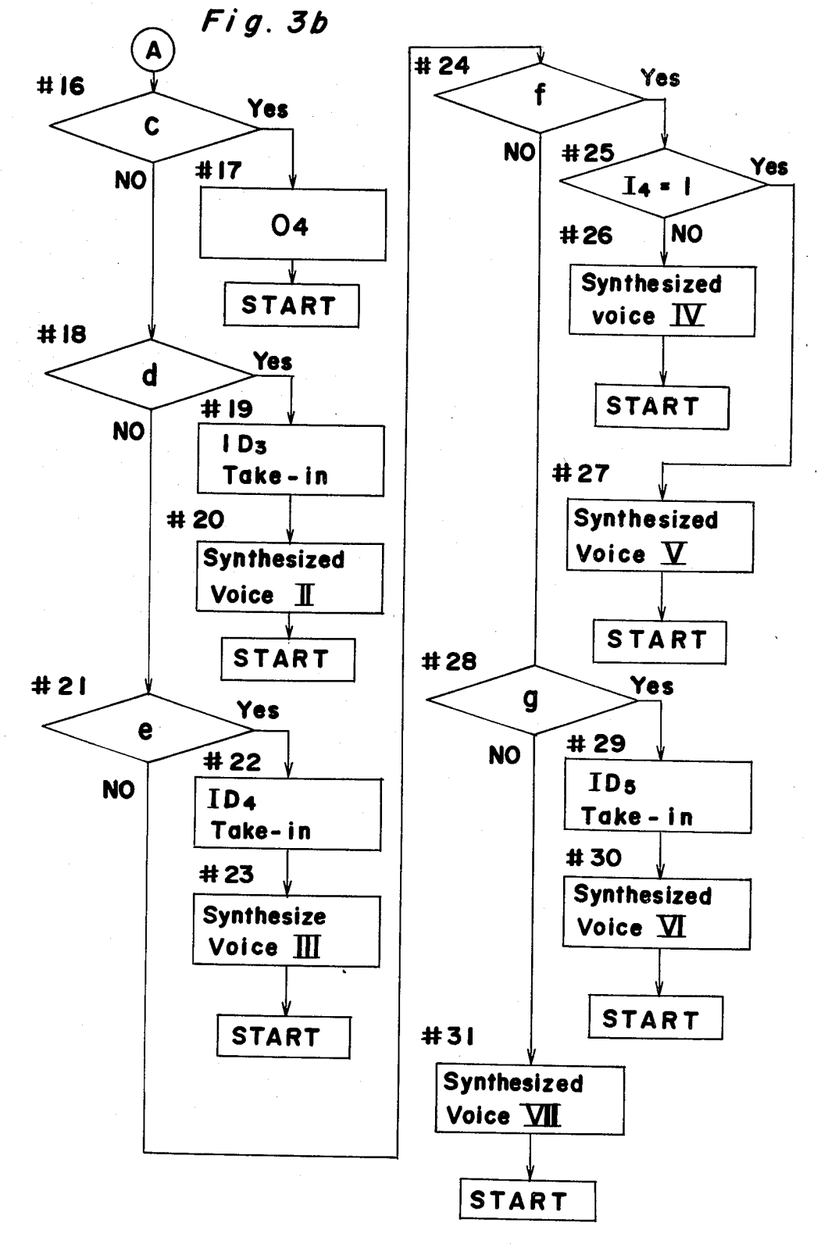

Referring to FIGS. 3a and 3b, there is shown a flow chart of a procedure carried out in the microcomputer. In the flow chart, synthesized voices I to VII correspond to announcements as described in Table 3.

TABLE 3

| Synthesized Voice | Announcement |
|---|---|
| I | "Command voice registered" |
| II | "F-stop XX" wherein XX is any one of "under", "1.4", "2", "2.4", "2.8", ..., "16", "22", "32" and "over", when data to ID3 includes at least one high level signal, or "Power" when data to ID3 includes no high level signal |
| III | "shutter speed XX" wherein XX is any one of "over", "1", "2", "4", ..., "500", "1000" and "under", when data to ID4 includes at least one high level signal, or "Power" when data to ID4 includes no high level signal |
| IV | "Flash light ready" |
| V | "Flash capacitor uncharged" |
| VI | "Frame No. XX" wherein XX is any one of a numeral from 1 to 36 |
| VII | "No registeration" |

Now the operation of the circuit of FIG. 2 is described with reference to the flow chart of FIGS. 3a and 3b. When the switch S2 is turned on and switch S3 is connected to the terminal a, the OR gate OR0 produces a high level signal to set the voice command responsive system in the learning mode in the step 2. Then, when the user speaks his desired command word into the microphone MC, the voice detector 4 produces at a very beginning of the spoken word a high level signal to start taking the spoken command word into the microcomputer through the frequency analyzer FA. The received command voice is first checked whether it is a random noise or not. If it is a noise, the procedure returns back to the start, if not, the procedure advances to the step 4 to process the command voice in the above described manner to extract its feature so as to rearrange the received command word into a binary code signal. The feature extracted and compressed data is registered at a section of the RAM 12 designated by the data from the decoder 5. Since the switch S3 is connected to the terminal a, the feature extracted data in this case is stored in the section a of the RAM 12. The above operations of voice coding and storing are carried out during a predetermined period of time from the moment when the detector 4 produces a high level signal. Then, in the step 7, synthesized voice of "Command voice registered" is produced from the speaker SP to inform the user of completion of registration of one command voice. Thereafter, the procedure returns back to the start.

Similar procedures can be carried out to register command words for all the command statements a to g by changing the connection of switch S3.

After all the command words are registered, the user may turn off the switch S2 for setting the voice command responsive system to the working mode. Thereafter, when the user speaks a command word into the microphone, the voice detector 4 produces a high level signal which is applied to the input terminal I2. Then, the procedure advances to step 9 and in turn to step 10 for coding the spoken command word by the feature extraction. It is to be noted that the procedure carried out in these steps 9 and 10 are identical with that carried out in the steps 3 and 4. Then, in the step 11, the coded spoken command word is compared with stored command words in the sections a to g in RAM 12 one by one and recognized by the one that essentially correlates.

When the coded spoken word correlates essentially with the one stored in the section a of RAM 12, it is recognized that the spoken word commands to supply power to light measuring and calculation circuit and to indicator. Therefore, the microcomputer produces a high level signal from the terminal O2 to the camera control circuit, and thereafter, the procedure returns back to start. When the coded spoken word correlates essentially with the one in section b, the command is to start the exposure control. In this case, the terminal O3 provides a high level signal to the circuit 7. When the coded spoken word correlates essentially with the one in section c, the command is to start self-timer photographing. In this case, the terminal O4 produces a high level signal. When the coded spoken word correlates essentially with the one in section d, the command is to inform the F-stop number through vocal announcement. In this case, the microcomputer receives necessary information from the terminal ID4 and provides necessary data to the voice synthesizer 6 to produce synthesized voice II of the table 3. When the coded spoken word correlates essentially with the one in section e, the command is to inform the shutter speed. In this case, the microcomputer receives necessary information from the terminal ID4 and provides data to the synthesizer 6 to produce synthesized voice III of the table 3. When the coded spoken word correlates essentially with the one in section f, the command is to inform of the charged condition of the flash light device. In this case, the computer checks the state of signal applied to the terminal I4 and provides data to the synthesizer 6 to produce synthesized voice IV of table 3 when the terminal I4 is receiving a high level signal, or synthesized voice V when the terminal I4 is receiving a low level signal. When the coded spoken word correlates essentially with the one in section g, the command is to inform of the number of used frames. In this case, the microcomputer first provides a high level signal from the terminal O5 for supplying power to the frame counting circuit and then, receives information through the terminal ID5 to provide data to the synthesizer 6 to produce synthesized voice VI.

When the coded spoken word correlates with none of the registered command words, i.e., when the coded data of spoken word differs from any one of the stored data in the RAM 12 with the difference being more than a predetermined allowable degree, the procedure advances to the step 31 to produce the synthesized voice VII from the synthesizer 6.

Although the microphone MC shown in FIG. 2 is directly connected to the amplifier 1, it is possible to employ a wireless microphone in place thereof.

Figure 4:
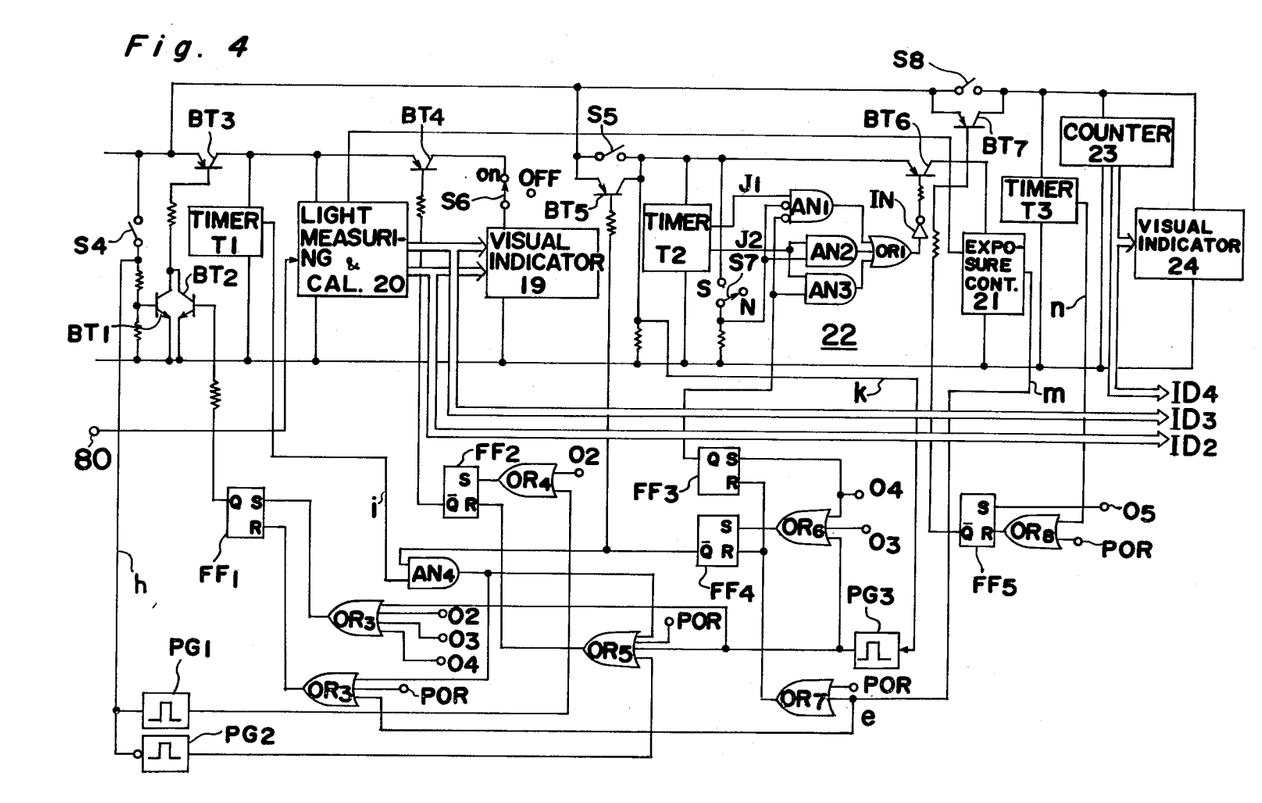
FIG. 4 is a circuit diagram showing a detail of a camera control circuit shown in FIG. 2.

Referring to FIG. 4, there is shown a detailed circuit diagram of the camera control circuit 7 shown in FIG. 2. A reference numeral 20 designates a light measuring and calculation circuit which measures scene light, makes exposure calculations with the measured value and sets exposure parameters and produces analog signals for carrying out the camera control and digital signals for effecting the indicator. It is to be understood that those analog and digital signals represent an exposure value for a suitable exposure. A reference numeral 19 denotes a visual-indicator for visually indicating an anticipated exposure value in accordance with the digital signal from the circuit 20, and 21 denotes an exposure control circuit for controlling the exposure based on the analog signal from the light measuring and calculation circuit 20. A reference numeral 22 is a self-timer control circuit, 23 is a counter for counting the number of used frames, and 24 is a visual-indicator for indicating the data obtained from the counter 23.

A switch S4 is associated with a shutter release button of a two step type, and is adapted to close when the release button is pressed halfway to the first step. The switch S4 may otherwise be closed by another separate switch for light measurement. A reference character S5 denotes a switch manually closed by, for example, further depression of the release button for starting the shutter release. Shown by S6 is a switch manually operated for turning the visual-indicator 19 on and off, S7 is a switch having a terminal N which is manually connected with a common terminal C when carrying out non-self-timer exposure, and a terminal S which is manually connected with the common terminal C when carrying out the self-timer exposure, and S8 is a manual switch for turning the counter 23, timer T3 and visual indicator 24 on and off.

A timer T1 produces an off signal after a lapse of a predetermined period from the start of the exposure value indication. A timer T2 counts time from a moment when the release signal is produced until the shutter is actually released and counts delay time for effecting self-timer operation. A timer T3 counts a predetermined period of time from a moment when power is supplied to the circuit for counting the used frames.

It is to be noted that, for substituting the manually operable switches S4, S5, S7 and S8, there are provided transistors BT2, BT5, flip-flop FF3 and transistor BT7, respectively, for camera operations in response to the spoken command voice.

When the spoken command a is recognized by the microcomputer, the terminal O2 of the input-and-output port 13 produces a high level signal which is applied through an OR gate OR3 to a flip-flop FF1 for setting the same. Accordingly, the transistor BT2 conducts to supply base current to a transistor BT3. The signal from the terminal O2 is also applied through OR gate OR4 to flip-flop FF2 to set the latter and render transistor BT4 conductive. Thus, the transistor BT3 supplies power to the light measuring and calculation circuit 20 and also to the visual indicator 19, provided that the switch S6 is on. Instead of the spoken command a, the circuits 20 and 19 can be supplied with power by the manual closure of the switch S4. In this case, a transistor BT1 conducts to supply base current to the transistor BT3.

When the spoken command b is recognized in the microcomputer, the terminal O3 of the input-and-output port 13 produces a high signal which is applied through an OR gate OR6 to a flip-flop FF4 for setting same. Accordingly, the transistor BT5 conducts to provide the same effect as the closure of the switch S5, thus starting the exposure control.

When the spoken command c is recognized in the microcomputer, the terminal O4 of the circuit 13 produces a signal which is applied to the flip-flop FF3 for setting the same. Accordingly, an AND gate AN1 is turned to a closed condition, regardless of any switched position of the switch S7, to prohibit any signal from a terminal J1 of the timer T2 to pass through the AND gate A1 to an OR gate OR1, and at the same time, the AND gate AN3 is opened to provide the same effect as the turning of the switch S7 to the terminal S in a manner as will be described later.

When the spoken command g is recognized in the microcomputer, the terminal O5 of the input-and-output port 13 produces a signal which is applied to a flip-flop FF5 for setting the same. Accordingly, a transistor BT7 conducts to supply power to the timer T3 and also to the counter 23. A further detailed operation of the circuit of FIG. 4 is described below.

When the switch S0 (FIG. 2) is turned on, a power-on-reset circuit (not shown) produces a signal which is applied through a terminal POR and OR circuits OR2, OR5, OR7 and OR8 to each one of the flip-flops FF1 to FF5 for resetting them. When the command voice a is spoken, a pulse signal produced from the terminal O2 sets the flip-flops FF1 and FF2. Accordingly, the transistors BT2, BT3 and BT4 conduct to supply power to each of the timer T1 and light measuring and calculation circuit 20 for starting light measurement and the calculation of exposure control values, and at the same time, to the visual indicator 19, when the switch S6 is closed, for visually indicating an anticipated exposure value commensurate with the calculated values. Under this condition, when the user utters a command voice d or e, the microcomputer actuates the voice synthesizer 6 to enunciate a F-stop number or shutter speed based on the data from the light measuring and calculation circuit 20. Then, the timer T1 produces a pulse along a lead line i after a predetermined period of time, e.g., 30 seconds, from the moment when the signal is produced from the terminal O2 for resetting the flip-flops FF1 and FF2 to cut off the power applied to the timer T1, light measuring and calculation circuit 20 and visual indicator 19.

An AND gate AN4 is provided for preventing the pulse along the lead line i from resetting the flip-flops FF1 and FF2 while transistor BT5 is conductive to energize the timer T2 and exposure control circuit 21, in response to the pulse obtained from the terminal O3 or O4. More specifically, when the timer T2 is actuated, it is necessary to maintain at least the light measuring and calculation circuit 20 actuated to provide exposure data to the exposure control circuit 21 so that when it actually releases the shutter at the end of the counting of the timer T2, the exposure can be controlled by the latest data from the light measuring and calculating circuit 20. To maintain the light measuring and calculation circuit 20 actuated, the AND gate AN4 receives a low level signal from the flip-flop FF4 in response to the pulse produced from either one of the terminals O3 and O4. The flip-flop FF4 continually produces a low level signal to the AND gate AN4 until the exposure control circuit 21 produces an exposure termination signal through line m after the photographing operation has been completed.

A high level signal is applied, simultaneously with the power supply to the timer T2, along a lead line k to a pulse generator PG3 for effecting the pulse generator PG3 to produce a pulse which is applied through an OR gate OR5 to the flip-flop FF2 for resetting the same. Accordingly, the visual indicator 19 is de-actuated.

Next, the operation when the power supply to the light measuring and calculation circuit 20 and visual indicator 19 is controlled by the manual switch S4 is explained. When the switch S4 is closed, the transistors BT1 and BT3 conduct to supply power to the light measuring and calculation circuit 20 and, at the same time, a high level signal is applied through a lead line h to a pulse generator PG1, which accordingly produces a pulse. The pulse produced from the pulse generator PG1 is applied through the OR gate OR4 to the flip-flop FF2 for setting the same for conducting the transistor BT4, and therefore, supplying power to the visual indicator 19. Thereafter, when the switch S4 is opened, a pulse generator PG2 produces a high level signal which resets the flip-flop FF2 to stop supplying power to the visual indicator 19. The opening of the switch S4 also stops the power supply to the light measuring and calculation circuit 20. In other words, the light measuring and calculation circuit 20 and the visual indicator 19 can be actuated only during the closure of the switch S4 in the manual mode.

When the command voice b is spoken, a pulse signal produced from the terminal O3 sets the flip-flop FF1 to supply power to the light measuring and calculation circuit 20, and also sets the flip-flop FF4 to supply power to the timer T2 through transistor BT5. The timer T2 counts a predetermined period of time, e.g., 10 msec., which is long enough for the light measuring and calculation circuit 20 to become stable, and produces a high level signal from its terminal j1 after the lapse of that time. In this case, when the switch S7 is connected to the terminal N, the high level signal from the terminal j1 is transmitted through the AND gate AN1 to the transistor BT6 for conducting the same. Accordingly, the exposure control circuit 21 is supplied with power. On the contrary, when the switch is connected to the terminal S, the high level signal from the terminal j1 is intercepted at the AND gate AN1. Accordingly, the transistor BT6 will not be actuated by the signal from the terminal j1. After lapse of a further time, e.g., 10 sec., a terminal j2 of the timer T2 produces a high level signal which is applied through the AND gate AN2 to the transistor BT6 for conducting the same to actuate the exposure control circuit 21. When the exposure control circuit 21 completes its operation, i.e., photographying operation, it produces a high level signal along a line m to reset the flip-flops FF1 and FF4. Accordingly, the power supply to the circuits 20, T2 and 22 stops.

When the command voice c is spoken into the microphone MC, a pulse is produced from the terminal O4 of the input-and-output port 13 for setting the flip-flops FF1, FF3 and FF4. Accordingly, the power is supplied to the light measuring and calculation circuit 20 and timer T2. In this case, since the flip-flop FF3 supplies a high level signal to an inverting input of the AND gate AN1, the signal from the terminal j1 of the timer T2 is prevented from being transmitted to the base of the transistor BT6. The high level signal from the flip-flop FF3 is also supplied to the AND gate AN3 so that the signal from the terminal j2 of the timer T2 is transmitted through the AND gate AN3 to the transistor BT6. Thus, power is supplied to the exposure control circuit 21. When the exposure control is completed, the pulse produced along the lead line m resets the flip-flops FF1, FF3 and FF4 for stopping the power supply to the circuits 20, T2 and 21.

Next, the operation when the switch S5 is manually closed is explained. When the switch S5 is closed, power is supplied to the timer T2 and, at the same time, a high level signal is applied through the lead line k to the pulse generator PG3 for producing a pulse that sets the flip-flops FF1 and FF4. In this case, if the switch S4 has been closed prior to the closure of the switch S5, the pulse produced from the generator PG3 resets the flip-flop FF2 to stop the power supply to the visual indicator 19. Then, when the switch S7 is connected to the terminal N, a non self-timer exposure is carried out, and when the switch S7 is connected to the terminal S, a self-timer exposure is carried out. After photographing, a high level signal is produced along the lead line m to stop the power supply to the circuits 20, T2 and 21.

In flash photography, the light measuring and calculation circuit 20 receives a high level signal from the lead line 80 when the flash light device 8 is ready to emit light, and the circuit 20 produces data of diaphragm aperture and shutter speed suitable for flash photography.

When the spoken command g is recognized in the computer, the terminal O5 produces a high level signal which sets the flip-flop FF5 to conduct a transistor BT7. When the transistor BT7 conducts, power is supplied to timer T3, counter 23 and visual indicator 24. Upon receipt of power, the timer T3 starts to count a predetermined period of time, e.g., 10 msec. and the counter 23 starts to read out and supply data of used frame number to the computer. When the timer T3 completes its counting, it produces a pulse which is fed through a lead line n to the flip-flop FF5, causing flip-flop FF5 to produce a high level signal to the transistor BT7 to stop the power supply to the timer T3, counter 23 and visual indicator 24. When the switch S8 is closed, the used frame number is displayed through the visual indicator 24 until the switch S8 is again opened.

It is to be noted that the counter 23 can be operatively associated with a mechanical counter including a binary code, or gray code, disc which rotates a predetermined pitch each time the film is extracted by one frame length.

According to the present invention, since the camera can be operated by a spoken voice, it is possible to control the camera without using a user's hands or eyes. Therefore, it is possible to carry out photography under severe conditions such as when the camera is set at an inaccessible place or when wobbling should be strictly avoided.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A control system for a camera which performs a plurality of operations, said system comprising:
   switching means for selectively bringing the control system to one of a learning mode and a working mode;
   voice coding means for coding a voice command to a recognizable pattern and for producing a voice feature signal;
   register means having a plurality of sections each being capable of registering one voice feature signal during said learning mode such that a plurality of voice feature signals corresponding to said plurality of camera operations are registered in said register means;
   designator means operable during said learning mode for designating said plurality of sections of said register means for registering said plurality of voice feature signals to respective designated sections;
   discriminator means operable during said working mode for discriminating one of said plurality of sections carrying a voice feature signal which correlates with a newly obtained voice feature signal;
   control means for controlling the camera such that the camera performs one of the operations commensurate with the section discriminated by the discriminator means, and
   means for producing an exposure data signal and an exposure data indication means, wherein said control means further includes means for reading out an exposure data signal from said exposure data signal producing means corresponding to the discriminated section of said register means and means for actuating said exposure data indication means to indicate an exposure datum commensurate with the read-out exposure data signal.

2. A control system as claimed in claim 1 further comprising an indicator means for indicating the failure of discrimination when said discriminator means does not discriminate any register section carrying a voice feature signal which correlates with said newly obtained voice feature signal.

3. A camera with a voice command system as claimed in claim 1, further comprising an indicator means for indicating the completion of registration of one voice feature signal.

4. A control system as claimed in claim 3, wherein said indicator means includes an audible indicator means.

5. A control system as claimed in claim 4, wherein said audible indicator means comprises means for generating a synthesized voice controlled by a microcomputer and providing data obtained from the camera through words.

6. A control system as claimed in claim 1, wherein said exposure indicator means is an audible indicator means.

7. A control system as claimed in claim 1, wherein said exposure data signal producing means is an indicator means for indicating a charged condition of a flash light device applied to said camera.

8. A control system as claimed in claim 1, wherein said exposure data indicator means is an indicator means for signal producing data corresponding to a used frame number.

9. A control system as claimed in claim 1 further comprising manual control means for effecting the camera operation through manual operation, said manual control means being arranged in parallel with said control means to act on a camera operation means parallelly.

10. A control system as claimed in claim 1, further comprising power switch means for turning on and off the control means.

11. A control system as claimed in claim 1 wherein said light measuring and calculating means includes means for calculating a F-stop number as said value of an exposure parameter.

12. An audio responsive camera for taking pictures having at least an automatic exposure control circuit, and a power supply comprising:
- a transducer connected to the power supply and responsive to audio sounds for generating electrical signals from a voice command;
- voice coding means for coding specific voice command electrical signals into specific signal patterns;
- means for storing a predetermined set of signal patterns;
- means for comparing a signal pattern generated by the voice coding means with the stored signal patterns and producing an output signal representative of a matched signal pattern, and
- means for controlling and/or monitoring an operational feature of the camera in response to the output signal.

13. The invention of claim 12 further including means for producing audible predetermined word comments in response to the output signal to indicate an operational condition of the camera.

14. The invention of claim 13 wherein the means for producing an audible predetermined word comment includes a speaker and a voice synthesizer circuit means.

15. The invention of claim 12 further including switch means for enabling the means for storing a predetermined set of signal patterns to receive and store a specific voice command electrical signal pattern from the user, the switch means operatively designating a particular signal pattern to an operational feature of the camera for storage.

16. The invention of claim 15 further including a timing circuit for automatically deactivating the means for controlling at a predetermined time period after an output signal is generated and responded to by the camera.

17. The invention of claim 16 further including means for automatically connecting the means for controlling and/or monitoring an operational feature of the camera to the power supply to activate the same when a predetermined voice command is received by the transducer.

18. The invention of claim 15 further including means for synthesizing audible predetermined word comments in response to the output signal to indicate an operational condition of the camera.

19. The invention of claim 18 wherein the operational condition is the number of film frames that have been exposed.

20. The invention of claim 18 wherein the operational condition is the level of electrical charge of the power supply.

21. The invention of claim 18 wherein the operational condition is the shutter speed.

22. The invention of claim 18 wherein the operational condition is the F stop number.

23. The invention of claim 15 wherein the voice coding means includes a buffer amplifier connected to the transducer, and a plurality of band pass filters to provide simultaneous frequency analysis of a voice command.

24. The invention of claim 23 further including a voice command detector circuit means for producing a start signal when the output of the amplifier exceeds a predetermined level.

25. The invention of claim 24 further including a multiplexer and an analog to digital conversion circuit means, the multiplexer sequentially transmitting the output of each band pass filter to the analog to digital conversion circuit to provide a signal pattern.

26. An audio responsive camera control system comprising:
- a transducer responsive to audio sounds for generating electrical signals from a voice command;
- voice coding means for coding a specific voice command electrical signal from said transducer, into a specific signal pattern;
- means for storing said specific signal pattern;
- means for comparing a signal pattern generated by the voice coding means with the stored signal pattern and producing an output signal representative of a matched signal pattern;
- light measuring and calculation means for measuring light from an object to be photographed and calculating a value of an exposure parameter as a function of the light measurement to produce an exposure signal commensurate with the calculated value;
- indicator means for indicating the calculated value in response to the exposure signal;
- power supply means for supplying electric power to said light measuring and calculation means and said indicator means;
- manual means for generating an actuation signal in response to a manual operation; and
- means for transmitting said output signal from said comparing means and said actuation signal from said manual means to said power supply means to actuate the latter in response to any one of the output signal and the actuation signal.

27. An audio responsive camera control system as claimed in claim 26 further comprising a timer means connected between said comparing means and said power supply means for deactivating said power supply means after the lapse of a predetermined time from the actuation of the same in response to the output signal.

28. An audio responsive camera control system as claimed in claim 26 further comprising a switch means for making said voice coding means and comparison means inoperative.

29. An audio responsive camera control system as claimed in claim 26 wherein said indicator means includes an audible indicator means for indicating said value of the exposure parameter with sound.

30. An audio responsive camera control system comprising:
- a transducer responsive to audio sounds for generating electrical signals from a voice command;

voice coding means for coding a specific voice command electrical signal from said transducer, into a specific signal pattern;

means for storing said specific signal pattern;

means for comparing a signal pattern generated by the voice coding means with the stored signal pattern and producing an output signal representative of a matched signal pattern;

light measuring and calculation means for measuring light from an object to be photographed and calculating a value of an exposure parameter as a function of the light measurement to produce an exposure signal commensurate with the calculated value;

display means for visually indicating the calculated value in response to the exposure signal;

exposure control means for controlling camera exposure in accordance with said exposure signal;

power supply means for supplying electrical power to said light measuring and calculation means, said display means and said exposure control means;

manual means for generating an actuation signal in response to a manual operation; and power supply control means responsive to the actuation signal from said manual means for activating the power supply through said power supply means to said light measuring and calculation means, said display means and said exposure control means, and responsive to the output signal from said comparing means for causing the power supply through said power supply means to said light measuring and calculating means and said exposure control means, with said display means being left deenergized.

31. An audio responsive camera control system as claimed in claim 30 wherein said exposure control means includes means for generating a completion signal with completion of an exposure operation, and said power supply control means includes means for deactivating said power supply means in response to said completion signal.

32. An audio responsive camera control system as claimed in claim 30 further comprising a switch means for deactivating said voice coding means and comparing means.

33. An audio responsive camera control system comprising:
a transducer responsive to audio sounds for generating electrical signals from a voice command;
voice coding means for coding a specific voice command electrical signal from said transducer, into a specific signal pattern;
means for storing said specific signal pattern;
means for comparing a signal pattern generated by said voice coding means with the stored signal pattern and producing an output signal representative of a matched signal pattern;
exposure control means for controlling camera exposure;
manual means for generating an initiation signal for initiating camera exposure; and
means for transmitting said output signal and said initiation signal to said exposure control means such that the latter means is initiated by any one of said output and initiation signals.

34. An audio responsive camera control system as claimed in claim 33 further comprising switch means for deactivating said voice coding means and said comparing means.

35. An audio responsive camera control system comprising:
a transducer responsive to audio sounds for generating electrical signals from a voice command;
voice coding means for coding a specific voice command electrical signal from said transducer, into a specific signal pattern;
means for storing said specific signal pattern;
means for comparing a signal pattern generated by the voice coding means with the stored signal pattern and producing an output signal respresentative of a matched signal pattern;
selection means manually, selectively settable to a normal photography position and to a self-timer photography position;
exposure control means for controlling camera exposure;
timer means for generating an initiation signal after the lapse of a given time as necessary for self-time photography, from receipt of an input signal, said timer means being coupled with said exposure control means to initiate the latter by said initiation signal;
signal control means for directing said output signal to said timer means as the input signal of the latter with said selection means set to the self-timer photography position and to said exposure control means for the initiation thereof without the self-time delay with said selection means set to the normal photography position.

36. An audio responsive camera control system comprising;
a transducer responsive to audio sounds for generating electrical signals from a voice command;
voice coding means for coding a specific voice command electrical signal from said transducer, into a specific signal pattern;
means for storing said specific signal pattern;
means for comparing a signal pattern generated by said voice coding means with the stored signal pattern and producing an output signal representative of a matched signal pattern;
light measuring and calculating means for measuring light from an object to be photographed and calculating a value of an exposure parameter as a function of the light measurement to produce an exposure signal commensurate with the calculated value;
power supply means for supplying electrical power to said light measuring and calculating means;
audible indication means for making indication by sound; and
indication control means responsive to the output signal from said comparing means for reading out the exposure signal and causing said audible indication means to indicate the exposure parameter value corresponding to the exposure signal and to indicate no-power supply to said light measuring and calculation means when any exposure signal cannot be read out.

37. An audio responsive camera control system as claimed in claim 36 wherein said light measuring and calculating means includes means for calculating F-stop number as said value of an exposure parameter.

38. An audio responsive camera control system as claimed in claim 36 wherein said light measuring and calculating means includes means for calculating shutter speed value as said value of an exposure parameter.

39. An audio responsive camera control system as claimed in claim 36 further comprising switch means for deactivating said voice coding means and comparing means.

40. An audio responsive camera control system comprising:
  a transducer responsive to audio sounds for generating electrical signals from a voice command;
  voice coding means for coding a specific voice command electrical signal from said transducer, into specific signal pattern;
  means for storing said specific signal pattern;
  means for comparing a signal pattern generated by the voice coding means with the stored signal pattern and producing an output signal representative of a matched signal pattern;
  light measuring an calculating means for measuring light from an object to be photographed and calculating a value of an exposure parameter as a function of the light measurement to produce an exposure signal commensurate with the calculated value;
  audible indication means for indicating, by sound, the exposure parameter value in accordance with the exposure signal;
  visual indication means for visibly indicating the exposure parameter value in accordance with the exposure signal;
  manual means for generating an initiation signal in response to manual operation thereon; and
  means for actuating said audible indication means in response to said output signal and actuating said visual indication means at least in response to said initiation signal.

41. An audio responsive camera control system comprising:
  a transducer responsive to audio sounds for generating electrical signals from a voice command;
  voice coding means for coding a specific voice command from said transducer, into specific signal pattern;
  means for storing said specific signal pattern;
  means for comparing a signal pattern generated by the voice coding means with the stored signal pattern and producing an output signal representative of a matched signal pattern;
  a flash light device which generates a ready signal when it becomes ready for operation;
  audible indication means for making audible indication in response to said ready signal;
  visual indication means for making a visual indication in response to said ready signal;
  manual means for generating an initiation signal in response to manual operation thereto, and
  means for actuating said audible indication means in response to the output signal and said visual indication means at least in response to the initiation signal.

42. An audio responsive camera control system as claimed in claim 41 further comprising switch means for deactivating said voice coding and said comparing means.

43. A control system for a camera which performs a plurality of operations, said system comprising:
  switching means for selectively bringing the control system to one of a learning mode and a working mode;
  voice coding means for coding a voice command to a recognizable pattern and for producing a voice feature signal;
  register means having a plurality of sections each being capable of registering one voice feature signal during said learning mode such that a plurality of voice feature signals corresponding to said plurality of camera operations are registered in said register means;
  designator means operable during said learning mode for designating said plurality of sections of said register means for registering said plurality of voice feature signals to respective designated sections;
  discriminator means operable during said working mode for discriminating one of said plurality of sections in the register means carrying a voice feature signal which correlates with a newly obtained voice feature signal;
  means for producing an exposure data signal including means for measuring light from an object to be photographed and calculating a value of an exposure parameter as a function of the light measurement;
  an exposure data indication means, and
  control means for controlling the camera such that the camera performs one of the operations commensurate with the section discriminated by the discriminator means, including means for reading out an exposure data signal from the exposure data signal producing means corresponding to the discriminated section of said register means, and means for actuating said exposure data indication means to indicate an exposure data commensurate with the read-out exposure data signal.

44. A control system as claimed in claim 43 wherein said exposure data signal producing means is an indicator means for indicating an F-stop number.

45. A control system for a camera which performs a plurality of operations, said system comprising:
  switching means for selectively bringing the control system to one of a learning mode and a working mode;
  voice coding means for coding a voice command to a recognizable pattern and for producing a voice feature signal;
  register means having a plurality of sections each being capable of registering one voice feature signal during said learning mode such that a plurality of voice feature signals corresponding to said plurality of camera operations are registered in said register means;
  designator means operable during said learning mode for designating said plurality of sections of said register means for registering said plurality of voice feature signals to respective designated sections;
  discriminator means operable during said working mode for discriminating one of said plurality of sections carrying a voice feature signal which correlates with a newly obtained voice feature signal;
  a light measuring and calculation circuit means for measuring light from an object to be photographed and calculating a value of an exposure parameter as a function of the light measurement, and control means for controlling the camera such that the camera performs one of the operations commensurate with the section discriminated by the discriminator means including a control signal producing means adapted to produce a signal in accordance with the discriminator means for causing said light measuring and calculation circuit means to determine an exposure parameter.

46. A control system as claimed in claim 45 wherein said light measuring and calculating means includes means for calculating a shutter speed value as said value of an exposure parameter.

47. A control system for a camera which performs a plurality of operations, said system comprising:

switching means for selectively bringing the control system to one of a learning mode and a working mode;

voice coding means for coding a voice command to a recognizable pattern and for producing a voice feature signal;

register means having a plurality of sections each being capable of registering one voice feature signal during said learning mode such that a plurality of voice feature signals corresponding to said plurality of camera operations are registered in said register means;

designator means operable during said learning mode for designating said plurality of sections of said register means for registering said plurality of voice feature signals to respective designated sections;

discriminator means operable during said working mode for discriminating one of said plurality of sections carrying a voice feature signal which correlates with a newly obtained voice feature signal;

a self-timer circuit means for controlling a self-timer camera exposure, and control means for controlling the camera such that the camera performs one of the operations commensurate with the section discriminated by the discriminator means including a control signal producing means, operatively connected with the self-timer circuit means for producing a signal in accordance with the discriminating means for controlling the functioning of the self-timer circuit means.

48. A control system for a camera which performs a plurality of operations, said system comprising:

switching means for selectively bringing the control system to one of a learning mode and a working mode;

voice coding means for coding a voice command to a recognizable pattern and for producing a voice feature signal;

register means having a plurality of sections each being capable of registering one voice feature signal during said learning mode such that a plurality of voice feature signals corresponding to said plurality of camera operations are registered in said register means;

designator means operable during said learning mode for designating said plurality of sections of said register means for registering said plurality of voice feature signals to respective designated sections;

discriminator means operable during said working mode for discriminating one of said plurality of sections carrying a voice feature signal which correlates with a newly obtained voice feature signal;

an exposure control means for controlling camera exposure, and control means for controlling the camera such that the camera performs one of the operations commensurate with the section discriminated by the discriminator means including a control signal producing means, operatively connected to said exposure control means for producing a signal in accordance with the discriminating means for starting the operation of said exposure control means.

49. A camera control system comprising:

first selection means manually, selectively settable to normal photography position and to a self-timer photography position;

exposure control means for controlling camera exposure;

manual means for generating a first initiation signal in response to manual operation thereon;

responsive means for generating a second initiation signal in response to a command signal given from a location remote from the camera;

timer means which commences its time count in response to any of said first and second initiation signals and generates a first count completion signal after a lapse of a given first delay time from the commencement of the time count and a second count completion signal after a lapse of second given delay time from the commencement of the time count;

second selection means for transmitting said first count completion signal upon receipt of said first initiation signal with said first selection means set to the normal photography position, said second count completion signal upon receipt of said first initiation signal with said first selection means set to the self-timer photography position, and said second count completion signal upon receipt of said second initiation signal regardless of the position of said first selection means, and means for actuating said exposure control means in response to said first or second count completion signal transmitted by said second selection means.

50. A camera control device as claimed in claim 49 wherein said responsive means includes:

a transducer responsive to audio sounds for generating electrical signals from a voice command as said command signal;

voice coding means for coding a specific voice command electrical signal from said transducer, into a specific signal pattern;

means for storing said specific signal pattern; and means for comparing a signal pattern generated by the voice coding means with the stored signal pattern and producing said output signal as representative of a matched signal pattern.

* * * * *